(No Model.) 6 Sheets—Sheet 3.
C. F. SMITH.
CORN HARVESTER AND HUSKER.
No. 377,649. Patented Feb. 7, 1888.
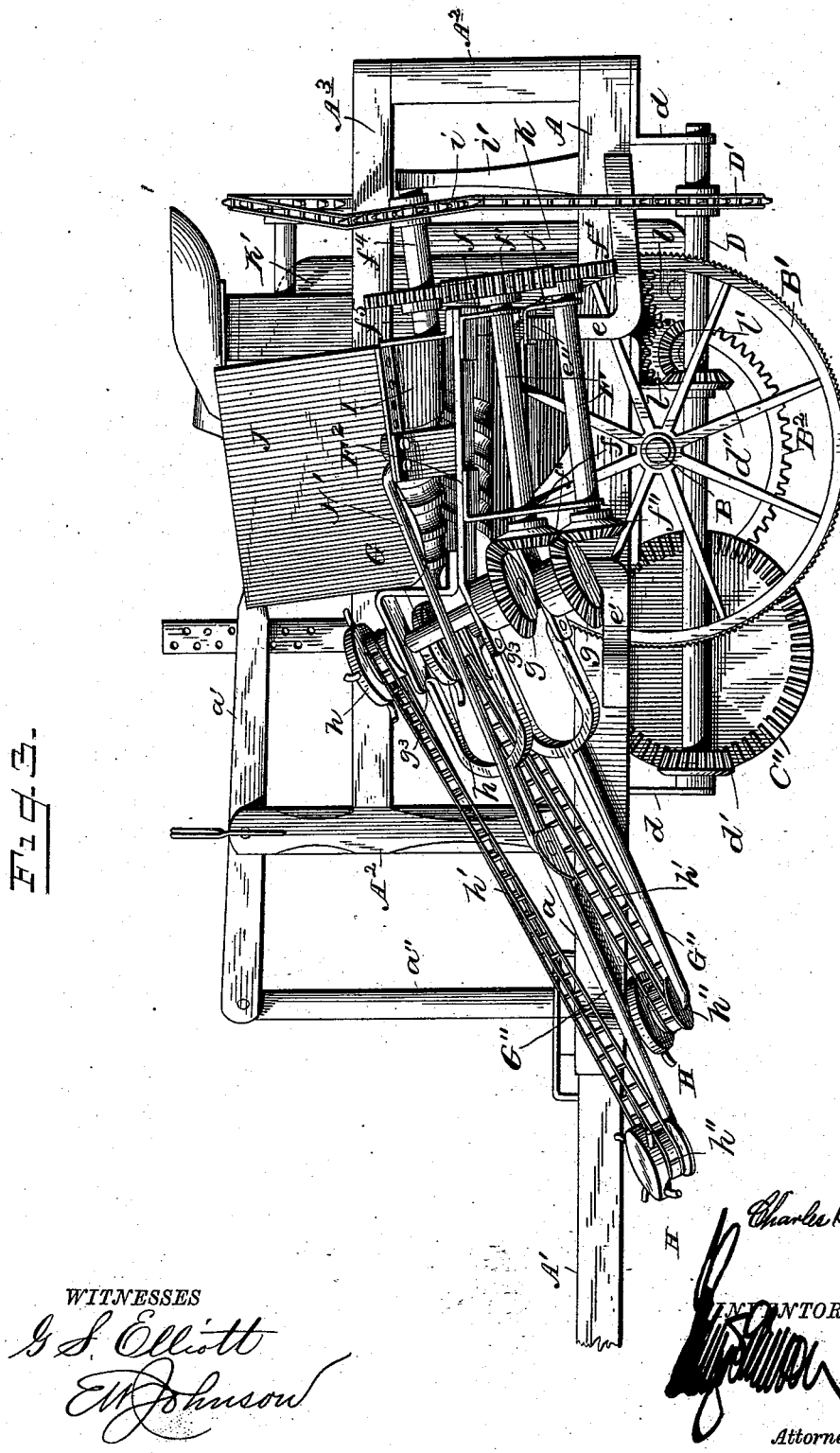

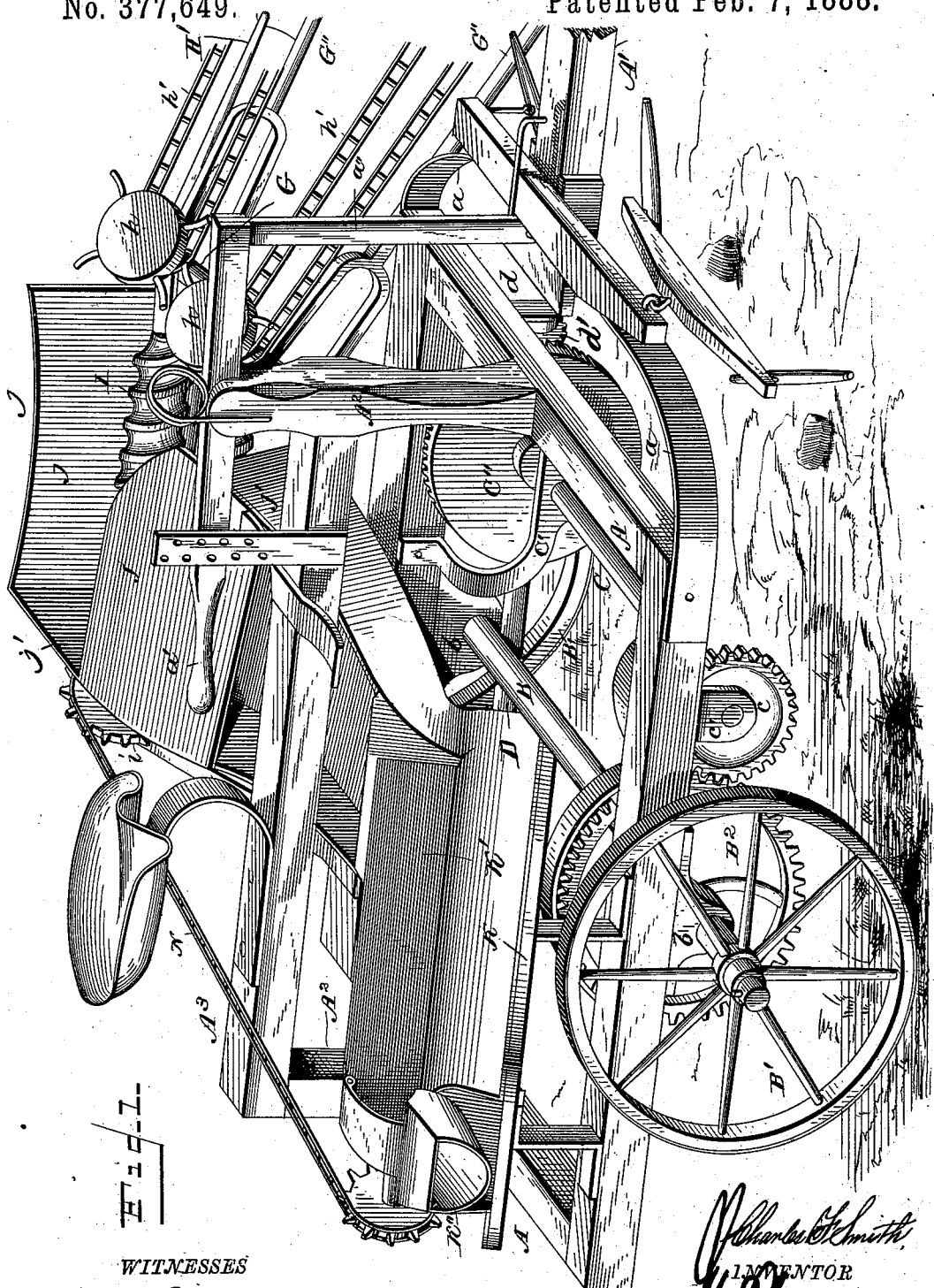

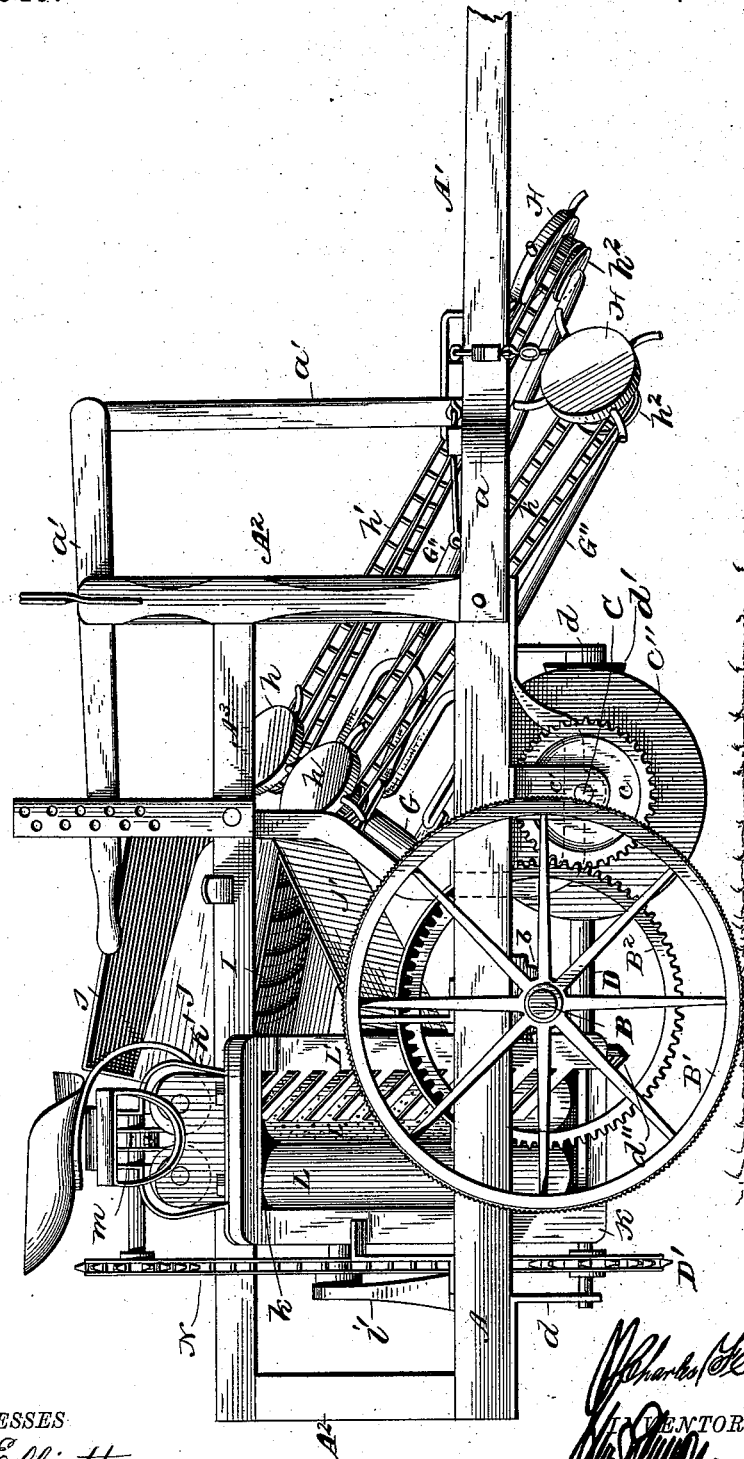

(No Model.) 6 Sheets—Sheet 4.
C. F. SMITH.
CORN HARVESTER AND HUSKER.
No. 377,649. Patented Feb. 7, 1888.
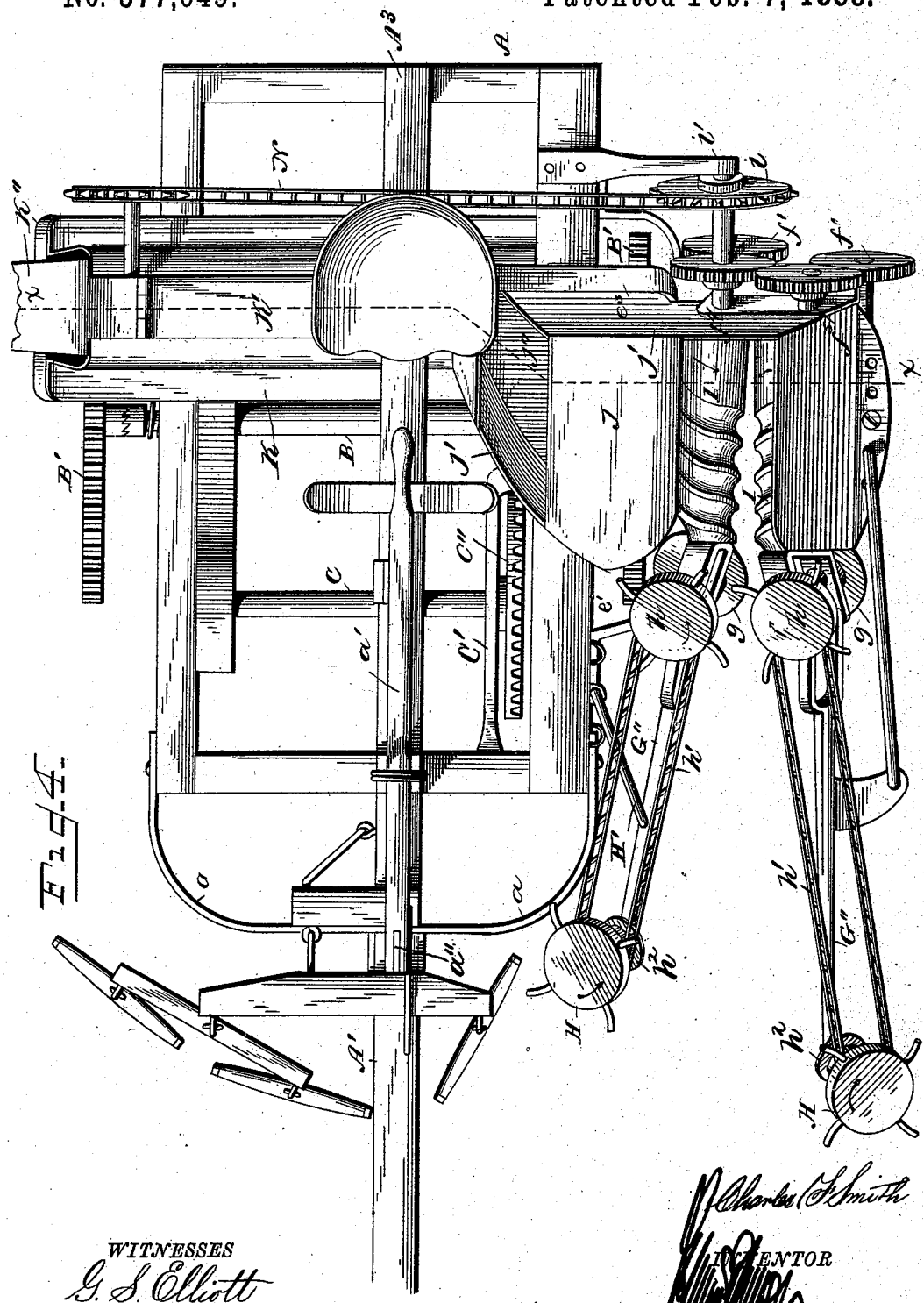
WITNESSES
G. S. Elliott
E. W. Johnson
Charles F. Smith
INVENTOR
Attorney (No Model.) 6 Sheets—Sheet 5.
C. F. SMITH.
CORN HARVESTER AND HUSKER.
No. 377,649. Patented Feb. 7, 1888.
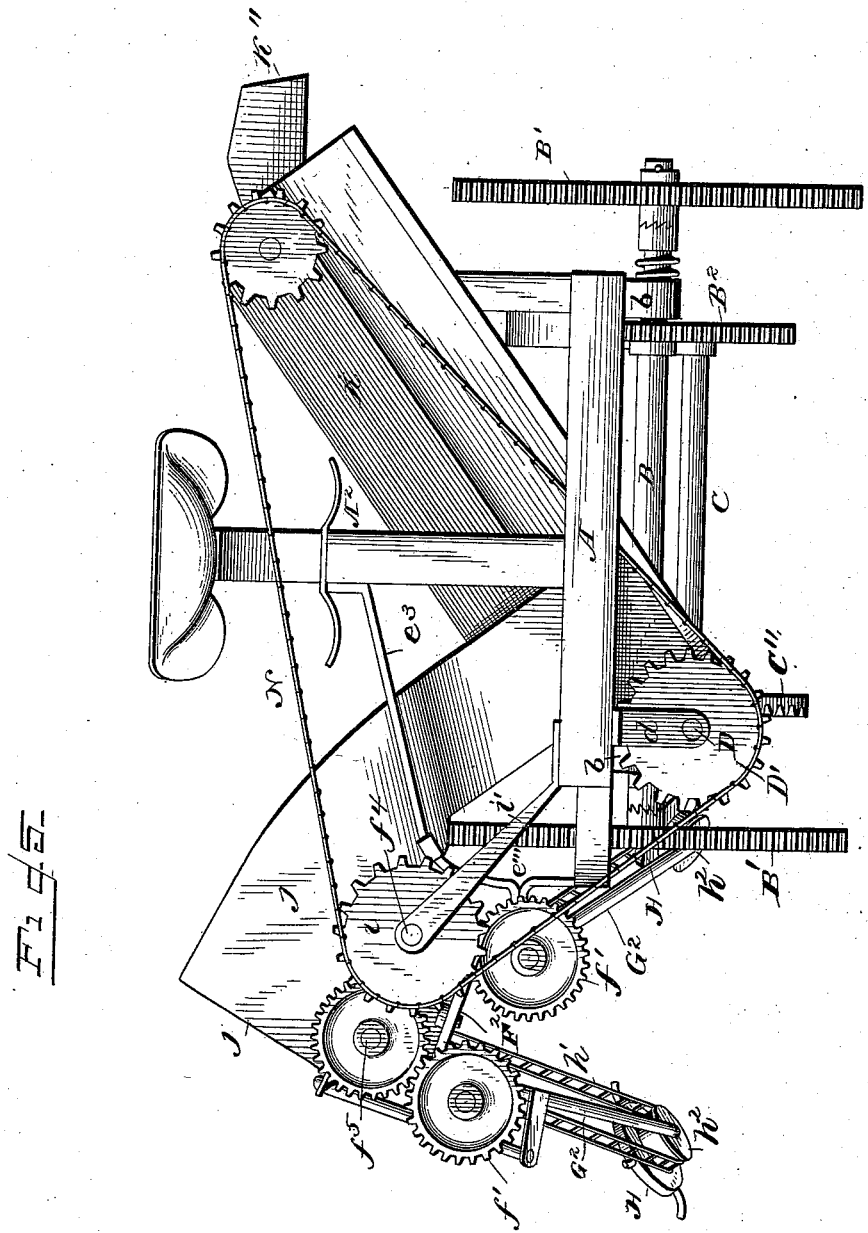
WITNESSES (No Model.) 6 Sheets—Sheet 6.
C. F. SMITH.
CORN HARVESTER AND HUSKER.
No. 377,649. Patented Feb. 7, 1888.
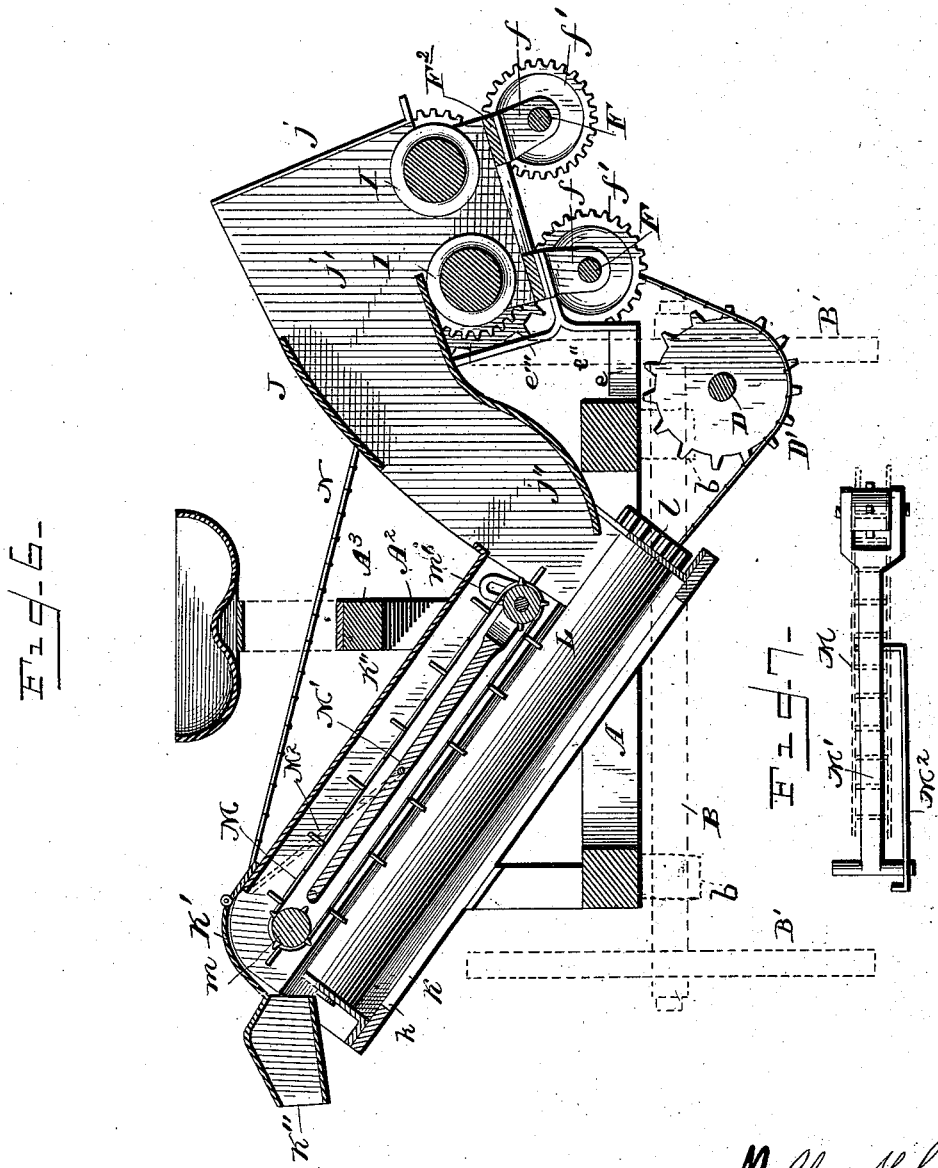

UNITED STATES PATENT OFFICE.

CHARLES F. SMITH, OF HUTCHINSON, KANSAS.

CORN HARVESTER AND HUSKER.

SPECIFICATION forming part of Letters Patent No. 377,649, dated February 7, 1888.

Application filed February 25, 1886. Serial No. 193,174. (No model.)

*To all whom it may concern:*

Be it known that I, CHARLES F. SMITH, a citizen of the United States of America, residing at Hutchinson, in the county of Reno and State of Kansas, have invented certain new and useful Improvements in Corn Harvesters and Huskers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in corn harvesters and huskers, the object of my invention being to provide an apparatus which is adapted when drawn across a field of corn to separate the ears from the stalks, and then carry the ears which have the husks thereon to a conveying and stripping mechanism, whereby the husks and silk will be removed from the ear of corn and the corn delivered from the apparatus; and to this end my invention consists in an apparatus, the construction of which will be hereinafter fully set forth and the novel features thereof claimed.

In the accompanying drawings, which illustrate my invention, Figure 1 is a perspective view of a corn-harvester constructed in accordance with my invention. Fig. 2 is a side view looking toward the delivering-spout. Fig. 3 is a side view looking toward the opposite side of the harvester. Fig. 4 is a plan view. Fig. 5 is a rear view. Fig. 6 is a transverse section taken through the line $x$ $x$ of Fig. 4, and Fig. 7 is a detail view.

A refers to a suitable rectangular frame to the front end of which is pivotally secured hounds $a$, which serve as a connecting means for a draft-tongue, A', said draft-tongue being provided with a suitably-constructed three-horse equalizer, three horses being the usual number required to draw the apparatus. The hounds $a$ $a$ are pivotally attached to the front end of the rectangular frame A, and from the front and rear central portion of said rectangular frame project vertical standards $A^2$, said standards serving as a support for a longitudinal beam, $A^3$, upon which is located the driver's seat and foot-rest. The front vertical standard, $A^2$, projects above the horizontal beam $A^3$, and its upper end is bifurcated for the reception of the lever $a'$. The forward end of said lever is connected to a strap, $a''$, the lower end of said strap being attached to the rear end of the tongue. The lever $a'$ near its rear end is provided with means for engaging with the vertical bar attached to the horizontal beam $A^3$ for holding the same in any set position, thus affording a means for adjusting the angle of the tongue so as to regulate the inclination of the supporting-frame and harvester mechanism. The upper end of the front standard, $A^2$, is provided with a suitable rein guide or guard to hold the reins elevated so that they cannot become engaged with the operating mechanism.

The longitudinal beams of the main frame A are provided centrally on their under sides with bearings $b$ $b$, through which pass the main shaft B, said main shaft extending beyond the frame so as to provide axles for the supporting-wheels B'. The hubs of said supporting-wheels are provided on their inner sides with clutches, so that the axle will remain substantially stationary when the machine is backed or turned. (The construction of the spring-clutches is fully shown in Fig. 5 of the drawings.)

The main driving-shaft B has rigidly secured thereto, adjacent to the right-hand side of the main frame, a cog-wheel, $B^2$, which is covered partially by the cap secured to the frame. This cog-wheel $B^2$ engages with a similar cog-wheel, $c$, which is attached rigidly to the shaft C, which is journaled in suitable hangers or bearings, $c'$ and C', attached to the inner sides of the frame A. The hanger C' consists, preferably, of a bent bar which projects inwardly and downwardly and has a horizontal portion through which the shaft C passes, this construction providing a space for the beveled cog-wheel $C''$, which is rigidly secured to the transverse shaft C. The longitudinal beam of the rectangular frame on the left side of the apparatus on its under side is provided with hangers $d$ $d$, which serve as supports for a longitudinal shaft, D, said shaft having attached at one end thereof a beveled pinion, $d'$, which meshes with a beveled cog-wheel, $C''$. Motion from the main or driving shaft B, at a comparatively high rate of speed, is communicated through the medium of the shaft to the gathering and husking mechanism of the harvester, as will be hereinafter fully set forth. The shaft D, at suitable points, is provided with beveled pinion $d''$ and a sprocket-wheel, $D'$.

On the left side of the main frame are secured two substantial brackets, $e\, e'$, the bracket $e$ being provided with an outwardly-extending portion, $e''$, to which the frame of the gathering mechanism is attached. This bracket is re-enforced by a bar, $e^3$, which extends therefrom to the bar $A^3$. The bracket $e'$ is also similarly braced and has an outwardly-projecting portion, to which the other end of said frame is attached. By means of these brackets the mechanism for guiding the cornstalks to the stripping-rollers is supported in position. The brackets hereinbefore described support directly an open-ended frame, to the lower sides of which are secured hangers $f\, f$, which depend therefrom and serve as a support for the shafts F F, said shafts being provided at their rear ends with cog-wheels $f'$ and at their forward ends with beveled pinions $f''$, each of said beveled pinions meshing with pinions $g$, which are secured to the lower ends of the inclined shafts G. The shafts G are substantially parallel with each other and are supported in the open-ended frame $F^2$ by suitable brackets which extend slightly forward and are provided with perforations $g^3$ for the reception of the pivots in the bifurcated ends of the arms $G''$. The upper ends of the shafts G have rigidly secured thereto disks $h$, from which inclined arms project, and beneath said disks and attached thereto are sprocket-wheels, over which pass chains $h'$, which communicate motion to the sprocket-wheels $h''$, above which are located the disks H with bent arms, said disks being journaled on the ends of the projecting arms or bars $G''$, which diverge from each other. The angle of these arms or bars may be varied, and they are held in position by pivoted hooks $H'$, which are pivotally secured to the arms or bars $G''$ near their central portions, and the bent ends thereof engage with any one of a series of eyes attached to the frame of the apparatus. By thus arranging the bars their angle can be varied, and by disengaging the hooks $H'$ from the eyes they may be swung to one side out of operative position when it is desirable to move the apparatus from place to place.

The open-ended frame $F^2$, hereinbefore referred to, has at its rear end upwardly-projecting bearings, through which pass shafts $f^4$ and $f^5$. The shaft $f^4$ extends rearwardly, and is provided with a sprocket-wheel, $i$, the end of said shaft having a bearing in the bar $i'$, which extends from the main frame. The shafts $f^4$ and $f^5$ have rigidly mounted thereon cones I I, which are provided with spiral recesses throughout the greater portion of their length, said spirals terminating adjacent to the disks $h$.

It will be noted that as the apparatus is drawn across the field a rotary motion will be imparted to these cones through the intervention of a gearing, hereinbefore described, so as to cause them to rotate in the direction indicated by the arrows, (see Fig. 4 of the drawings,) and that the chains and disks with arms thereon will also rotate in the directions as indicated. The functions of these portions of the harvester are to gather the cornstalks as they stand in the field and guide the ears thereon to the rollers I, where the ears are separated from the stalk in the forward movement of the harvester, and after being separated fall in a receptacle, from whence they are carried upwardly, and in their upward movement the husk and silk are removed therefrom.

In order to prevent the ears of corn after being removed from the stalk falling at an undesired point, I provide a sheet-metal chute and fenders, J, which consist of an end piece, $j$, front and rear vertical portions, $j'$, and an inclined bottom, $j''$, which extends from the cones I to the husking and elevating mechanism.

K refers to an upwardly-inclined frame, which is provided on its under side with an opening, $k$, immediately above which are journaled two inclined rollers, L L, said rollers being geared to each other at their lower ends by pinions $l\, l$, one of said pinions having a beveled wheel, $l'$, which engages with the pinion $d''$ on the shaft D, so as to communicate a rotary motion thereto in the direction indicated by the arrows in Figs. 2 and 6. Beneath one of the rollers, preferably the forward one, is secured a forked plate, $L'$, the teeth of which come in contact with the surface of one of the rollers. This roller is provided on its surface with a series of projecting pins, and the forked plate will serve to keep the surface of the roller clean.

Above the rollers L L the covered frame $K'$ is contracted, and within said contracted portion an endless belt, M, is journaled. This endless belt is provided with a series of projecting teeth which pass above the rollers L L. This endless chain or belt M passes over at its upper end a sprocket-wheel, $m$, which is journaled between the casings, said sprocket-wheel being mounted on the shaft which projects therefrom, and is provided at its outer end with a larger sprocket-wheel, over which the endless chain or belt N passes. Pivoted beneath the sprocket-wheel $m$ is a bar, $M'$, the lower end of which is bifurcated and provided with a transverse shaft which extends beyond the same, so as to engage with slotted guide-plates $m'$, secured within the contracted portion of the cover $K'$. Between the bifurcated portions of the bar $M'$ is a sprocket-wheel, over which the endless chain or belt M passes. The bar $M'$ is forced or held downward by a spring, M², which is secured to the casing in any suitable manner and to the bar. By this construction I provide an endless belt at its lower end with a slight spring movement, whereby ears of corn of different sizes will be better fed upwardly by the chain and will be always held in contact with the rollers. The end of the casing or housing K has hinged thereto a spout, K", so that the corn after it has been husked and the silk removed therefrom will be fed out of said spout and may be collected in a suitable receptacle carried by the apparatus.

The gathering and husking operation of my apparatus when constructed as shown in the accompanying drawings is as follows: After the pole of the harvester is adjusted at the proper angle to bring the gathering-disks which are located at the lower end of the converging arms at a proper distance from the ground, the harvester is ready to commence its forward movement across the field. Said movement being on a line with the row of stalks, such stalks as may have fallen, as well as those which are standing, are gathered by the disks with the bent arms thereon between the chains h', and as the machine moves forward the stalks having the ears of corn thereon are fed into the U-shaped or open-ended frame between the conical and spirally grooved rollers I I, where the ears are removed from the stalks. The stalks then pass out of the apparatus, while the ears with the husks thereon fall in the receptacle J, having the inclined bottom, so as to lie upon the lower ends of the rollers L L. The ears will lie parallel in the receptacle upon the rollers, and as these rollers are rotated the husks thereon will be partially removed or torn from the ear or cob by the rollers, and the endless belt M, engaging said ears and husks, will convey said ears to the upper end of the rollers, and while being moved upward the husks will be thoroughly removed from the ear of corn and the silk will be removed from said ears by the teeth on one of the rollers. After the corn reaches the end of the rollers it will be delivered through the spout K" to any suitable receptacle or on the ground.

It will be noted that the ear of corn in its upward movement will be constantly rotated, so as to bring every part of its surface in contact with the rollers.

As the corn moves between the conical rollers I I, the stalk is partially crushed, so that the removal of the ear therefrom will be comparatively easy, and as these conical rollers turn in a downward direction they will not have a tendency to draw the stalk from the ground, but will leave the same standing. This is an especially valuable feature of my invention, as the stalks with the leaves thereon can be left standing in the fields until it is desired to gather the leaves therefrom for fodder. In husking and removing the silk from the ear of corn I employ two cylindrical rollers, the surfaces of which are plain with the exception of small teeth, which project therefrom for engaging with the finer particles of the husk and the silk of the corn. By employing a plain roller the grain or kernels are not broken or injured, as would be the case if spiral rollers were employed, and the ears are only held in contact with said rollers by a slight spring contact, which is changed automatically with the varying size of the ears.

I claim—

1. The combination, substantially as shown and described, of the main frame, the gathering-frame supported thereon and provided at its open forward end with forwardly-projecting brackets, bars connected at their rear ends to the forward ends of said brackets by upwardly-inclined pivots and mounted to swing laterally on said pivots, spindles journaled in the brackets parallel to said pivots, armed disks carried by the upper ends of said spindles, and beveled pinions on the other ends thereof, similar disks mounted in the forward ends of the bars connected to the brackets of the gathering-frame, belts or chains connecting the said disks, hooks H', to secure the bars in the desired position of adjustment, the mechanism, as described, for connecting the spindles with the ground-wheels, the stripping-rolls in the rear of the laterally-swinging bars, and husking mechanism consisting of a pair of rolls, a toothed belt to travel above the bight of said rolls, a down-chute leading from the harvesting mechanism to the lower end of the husking-rolls, and the connection between the harvesting and husking mechanisms and the ground-wheels of the machine.

2. The combination, with the main frame, of harvesting mechanism consisting of an open-ended frame having stripping-rolls and bars pivoted in front of said rolls to swing laterally, armed disks and chains carried by said bars and adjusting-hooks, and husking mechanism consisting of a pair of rolls, a toothed belt to travel above the bight of said rolls, a down-chute leading from the harvesting mechanism to the lower end of the husking-rolls, and a single chain or belt for connecting the harvesting and husking mechanisms with the ground-wheels of the machine, substantially as described.

3. The combination, with the main frame and a harvesting mechanism, constructed and arranged substantially as described, of a husking mechanism consisting of a pair of inclined rolls, and a toothed belt mounted at its upper end upon a fixed sprocket or pulley journaled above the rolls and at its lower end upon a sprocket or pulley arranged to be adjusted farther from or nearer to said rolls.

4. In a corn-harvesting machine, the combination, with the main frame and a gathering mechanism consisting of a pair of forwardly and downwardly projecting arms, which are pivoted to the main frame, and provided with armed disks, which are geared to each other, the arms having mechanism to adjust their inclination one to another, of the husking mechanism consisting of a pair of inclined rolls, and a toothed belt mounted at its upper end upon a fixed sprocket or pulley and at its
5 lower end upon an adjustable sprocket or pulley, so that the belt can be adjusted farther from or nearer to said rolls.

In testimony whereof I affix my signature in presence of two witnesses.

CHAS. F. SMITH.

Witnesses:
J. DEWITT WOLF,
M. SANDERS.